J. H. FLYNT.
Advertising Caster.

No. 213,041.        Patented Mar. 11, 1879.

Attest.
M. P. Flynt
A. S. Meeker.

Inventor.
James H. Flynt.

UNITED STATES PATENT OFFICE.

JAMES H. FLYNT, OF DULUTH, MINNESOTA.

IMPROVEMENT IN ADVERTISING-CASTERS.

Specification forming part of Letters Patent No. 213,041, dated March 11, 1879; application filed September 7, 1878.

*To all whom it may concern:*

Be it known that I, JAMES H. FLYNT, of Duluth, St. Louis county, Minnesota, have originated and designed an Advertising Caster or Cruet-Stand, to be used in hotels or restaurants, of which the following is a full, clear, and exact description, reference being had to the accompanying drawings, making part of this specification.

Figure 1:
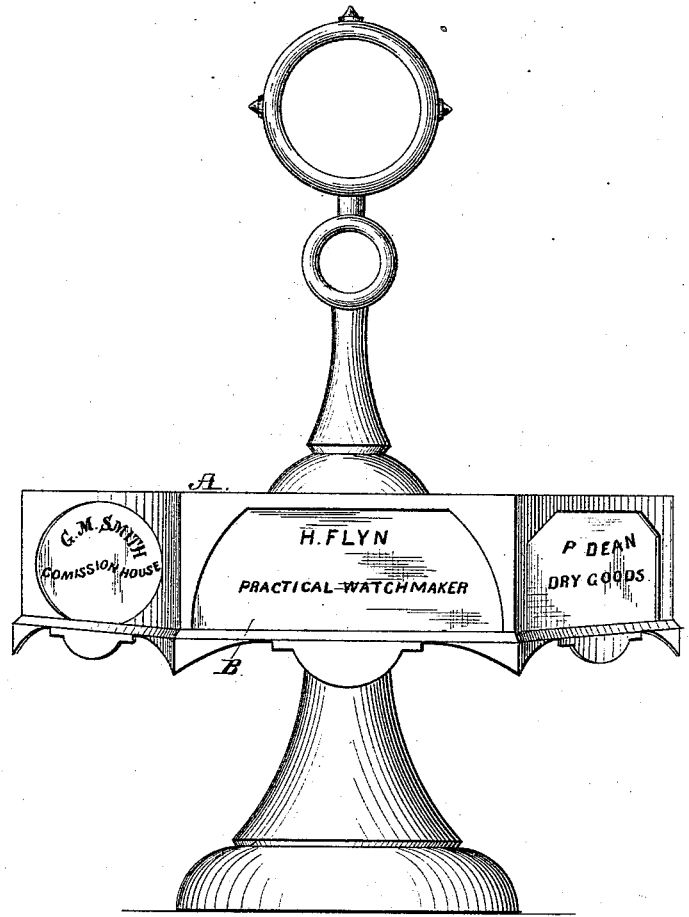

In Figure 1, A represents the frame of a caster with perforated rim. Under these perforations are inserted business-cards or advertisements covered with glass plates. B represents the glass plates, advertisements, and cards.

Figure 2:
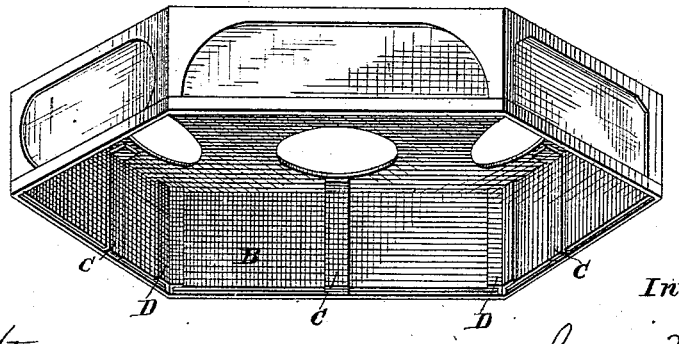

Fig. 2 represents the under side of the rim of a caster and the manner of fastening the glasses and cards.

B represents the card and glass, which slide into the grooves D D. C C C are springs fastened at the top to the frame of the caster. The bottoms of these springs are left free, and hook under the glass and cards, holding them securely in place.

By raising the bottoms of the springs the cards can be slipped in or out at will.

Casters with circular rims can be made in the same way by using bent glass instead of flat plates.

What I claim as my invention is—

A caster or cruet-stand having perforated rim with grooves D D, glass plates and business-cards B, and clamp-springs C C C, substantially in the manner and for the purpose above described.

JAMES H. FLYNT.

Witnesses:
　M. P. FLYNT,
　A. S. MEEKER.